(12) United States Patent
Zhang et al.

(10) Patent No.: US 9,407,361 B1
(45) Date of Patent: Aug. 2, 2016

(54) MINIMIZING POLARIZATION-DEPENDENT OPTICAL POWER FOR PM-M-QAM TRANSMITTERS

(71) Applicant: JUNIPER NETWORKS, INC., Sunnyvale, CA (US)

(72) Inventors: Bo Zhang, San Jose, CA (US); Theodore J. Schmidt, Gilroy, CA (US); Christian Malouin, San Jose, CA (US)

(73) Assignee: Juniper Networks, Inc., Sunnyvale, CA (US)

( * ) Notice: Subject to any disclaimer, the term of this patent is extended or adjusted under 35 U.S.C. 154(b) by 278 days.

(21) Appl. No.: 13/711,861

(22) Filed: Dec. 12, 2012

(51) Int. Cl.
*H04B 10/532* (2013.01)
*H04J 14/06* (2006.01)
*H04B 10/556* (2013.01)
*H04B 10/079* (2013.01)

(52) U.S. Cl.
CPC ........ *H04B 10/07955* (2013.01); *H04B 10/532* (2013.01); *H04B 10/5561* (2013.01); *H04J 14/06* (2013.01)

(58) Field of Classification Search
CPC ... H04J 14/06; H04B 10/532; H04B 10/5556; H04B 10/5561; H04B 10/556
See application file for complete search history.

(56) References Cited

U.S. PATENT DOCUMENTS

| | | | |
|---|---|---|---|
| 2002/0037131 A1* | 3/2002 | Naganuma ......... | G02B 6/29391 385/27 |
| 2007/0269215 A1* | 11/2007 | Sugaya ............... | H04J 14/0221 398/95 |
| 2009/0245795 A1* | 10/2009 | Joyner et al. ..................... | 398/79 |
| 2010/0067914 A1* | 3/2010 | Tanaka et al. ................. | 398/102 |
| 2010/0080571 A1* | 4/2010 | Akiyama et al. .............. | 398/184 |
| 2011/0044702 A1* | 2/2011 | Mizuguchi et al. ........... | 398/184 |
| 2012/0134676 A1* | 5/2012 | Kikuchi ......................... | 398/65 |
| 2012/0207475 A1* | 8/2012 | Tian et al. ....................... | 398/65 |
| 2012/0308240 A1* | 12/2012 | Akiyama ......... | H04B 10/50575 398/141 |
| 2014/0023368 A1* | 1/2014 | Bhandare et al. ............... | 398/65 |

OTHER PUBLICATIONS

Betty, I., et al., "An Empirical Model for High Yield Manufacturing of 10Gb/s Negative Chirp InP Mach-Zehnder Modulators", Optical Society of America, copyright 2005, 3 pages.

\* cited by examiner

*Primary Examiner* — Nathan Curs
(74) *Attorney, Agent, or Firm* — Harrity & Harrity, LLP

(57) ABSTRACT

A system is configured to determine a first power level of a first signal output from a first modulator, and determine a second power level of a second signal output from a second modulator. The first signal may include a first optical signal associated with a particular polarization orientation, and the second signal may include a second optical signal associated with the particular polarization orientation. The system is configured to determine a relationship between the first power level and the second power level, and to set, based on the relationship between the first power level and the second power level, a reverse bias voltage associated with the first modulator, where the reverse bias voltage may be used to control the first power level of the first signal.

20 Claims, 9 Drawing Sheets

US 9,407,361 B1

MINIMIZING POLARIZATION-DEPENDENT OPTICAL POWER FOR PM-M-QAM TRANSMITTERS

BACKGROUND

An optical transmitter may use a variety of modulation techniques to modulate an optical signal to carry information. Polarization multiplexing ("PM") is a modulation technique where two independent electrical data signals are modulated onto an optical carrier wave having orthogonal polarizations (e.g., an X polarization and a Y polarization) so that the overall data throughput is doubled without doubling the spectral bandwidth. Quadrature amplitude modulation ("QAM") is a modulation technique where two or more binary or multi-level electrical data signals are modulated, via an in-phase, or "I" channel, and a quadrature (90 degree) phase, or "Q" channel, onto a single optical carrier wave such that both the amplitude and the phase of the optical carrier wave are modulated with data to enhance the efficiency of the spectral occupancy.

In M-ary QAM ("mQAM" or "M-QAM"), one symbol may represent multiple bits to enhance the spectral efficiency. For example, modulation using 16-QAM can carry 4 bits per symbol, modulation using 64-QAM can carry 6 bits per symbol, etc. Generally speaking, a signal modulated using M-QAM can carry $\log_2$ (M) bits per symbol. Other modulation formats include binary phase-shift keying ("BPSK"), which is functionally equivalent to 2-QAM modulation, and quadrature phase-shift keying ("QPSK"), which is sometimes referred to as 4-QAM. A semiconductor-based modulator, such as a modulator constructed of indium phosphide, may be used in the generation of M-QAM or PM-M-QAM optical signals.

SUMMARY

According to some implementations, a system is configured to determine a first power level of a first signal output from a first modulator, and determine a second power level of a second signal output from a second modulator. The first signal may include a first optical signal associated with a particular polarization orientation, and the second signal may include a second optical signal associated with the particular polarization orientation. The system is configured to determine a relationship between the first power level and the second power level, and to set, based on the relationship between the first power level and the second power level, a reverse bias voltage associated with the first modulator, where the reverse bias voltage may be used to control the first power level of the first signal.

According to some other implementations, a system is configured to determine a first power level of a first signal output from a first modulator, and determine a second power level of a second signal output from a second modulator. The first signal may include a first optical signal associated with a first polarization orientation, and the second signal may include a second optical signal associated with a second polarization orientation. The first modulator may include a first plurality of tributary modulators, and the second modulator may include a second plurality of tributary modulators. The system is configured to determine a relationship between the first power level and the second power level, and set, based on the relationship between the first power level and the second power level, a reverse bias voltage associated with the first modulator, where the reverse bias voltage may be used to control the first power level of the first signal.

According to some other implementations, a system is configured to determine a first power level of a first signal output from a first modulator, and determine a second power level of a second signal output from a second modulator. The first signal may include a first optical signal associated with a first polarization orientation, and the second signal may include a second optical signal associated with a second polarization orientation. The system is configured to determine a relationship between the first power level and the second power level, and set, based on the relationship between the first power level and the second power level, a reverse bias voltage associated with the first modulator, where the reverse bias voltage may be used to control the first power level of the first signal.

DETAILED DESCRIPTION

Figure 1A:
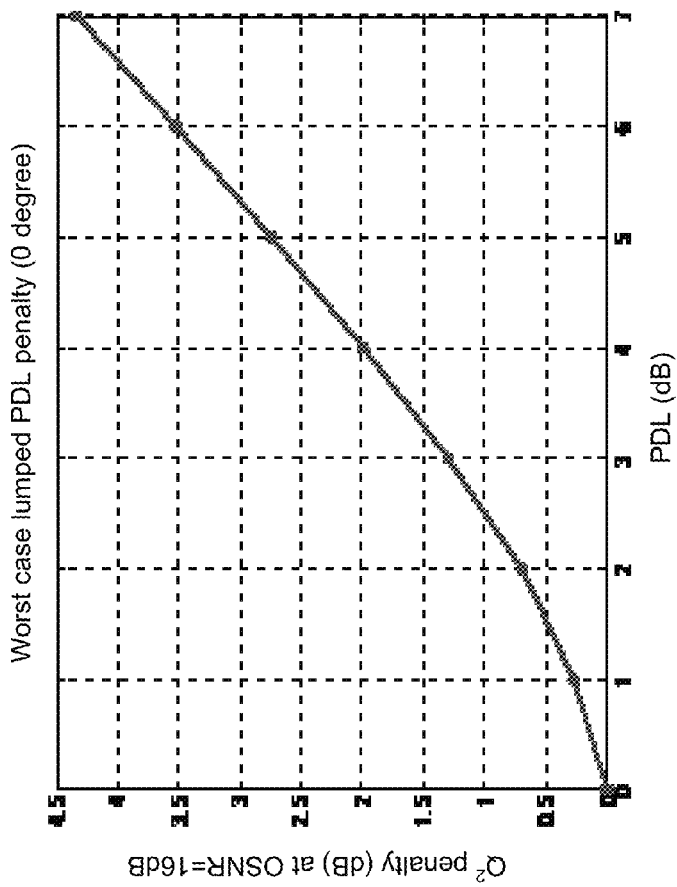
FIGS. 1A and 1B are diagrams of an overview of an example implementation described herein.

The following detailed description of example implementations refers to the accompanying drawings. The same reference numbers in different drawings may identify the same or similar elements.

An optical modulator may be used to convert an electrical signal into an optical representation of the electrical signal. As used herein, an "optical signal" may be used to refer to the optical representation of the electrical signal (not necessarily in the same format as the optical signal). An optical modulator may use polarization multiplexing to modulate an optical carrier wave to transmit information. Polarization multiplexing ("PM") is a modulation technique where an optical carrier wave may have different optical polarizations (e.g., may oscillate with a particular polarization or electromagnetic orientation) that are independently and simultaneously modulated via electrical signals (e.g., information and/or data). The different polarizations may be referred to herein as an "X polarization" and a "Y polarization," and the X polarization and the Y polarization may be orthogonal (or approximately orthogonal) to one another. For example, the X polarization may be horizontally polarized light, and the Y polarization may be vertically polarized light. However, the X and Y polarizations need not be horizontal and vertical polarizations, and need not be orthogonal.

An optical modulator may also use quadrature amplitude modulation to modulate an optical carrier wave to transmit information. Quadrature amplitude modulation ("QAM") is a modulation technique where two or more binary or multi-level electrical data signals are modulated, via an in-phase, or "I" channel, and a quadrature (90 degree or approximately 90 degree) phase, or "Q" channel, onto a single optical carrier wave such that both its amplitude and phase are modulated with data to enhance the efficiency of the spectral occupancy.

In M-ary QAM ("mQAM" or "M-QAM"), one symbol may represent multiple bits to enhance spectral efficiency. For example, modulation using 16-QAM can carry 4 bits per symbol, modulation using 64-QAM can carry 6 bits per symbol, etc. Generally speaking, a transmission modulated using M-QAM can carry $\log_2$ (M) bits per symbol. Other modulation techniques include binary phase-shift keying ("BPSK"), quadrature phase-shift keying ("QPSK"), differential quadrature phase-shift keying ("DQPSK"), and on-off keying ("OOK"). Implementations described herein may be applied to any of the above or similar modulation techniques.

When an optical modulator uses both PM and M-QAM ("PM-mQAM") to modulate optical carrier waves, the modulator combines four optical signals: one on the I channel of the X polarization, one on the Q channel of the X polarization, one on the I channel of the Y polarization, and one on the Q channel of the Y polarization. Implementations described herein may be applied to modulators that use PM-QAM, PM-mQAM, PM-BPSK, PM-QPSK (e.g., with coherent detection), PM-DQPSK (e.g., with direct detection), PM-OOK (e.g., with direct detection), or similar modulation techniques.

When signals are modulated using PM modulation, signals carried at different polarizations may experience different power losses when traveling through a waveguide and/or a device. This is known as polarization-dependent loss ("PDL"). Polarization-dependent loss is a statistical impairment that depends on the quantity and relative orientation among the concatenated waveguides and cascaded devices in a system chain. The transmission power of the four signals produced by PM-mQAM modulation (e.g., IX, QX, IY, and QY) may differ when the signals are generated by an optical transmitter, which adds statistically with the polarization-dependent loss experienced by the signals during transmission, and impacts the system-wide polarization-dependent loss experienced by the signals as the signals propagate through an optical network. Implementations described herein may decrease system-wide polarization-dependent loss by equalizing the optical power level at which each of the four optical signals is generated and transmitted.

Figure 1B:
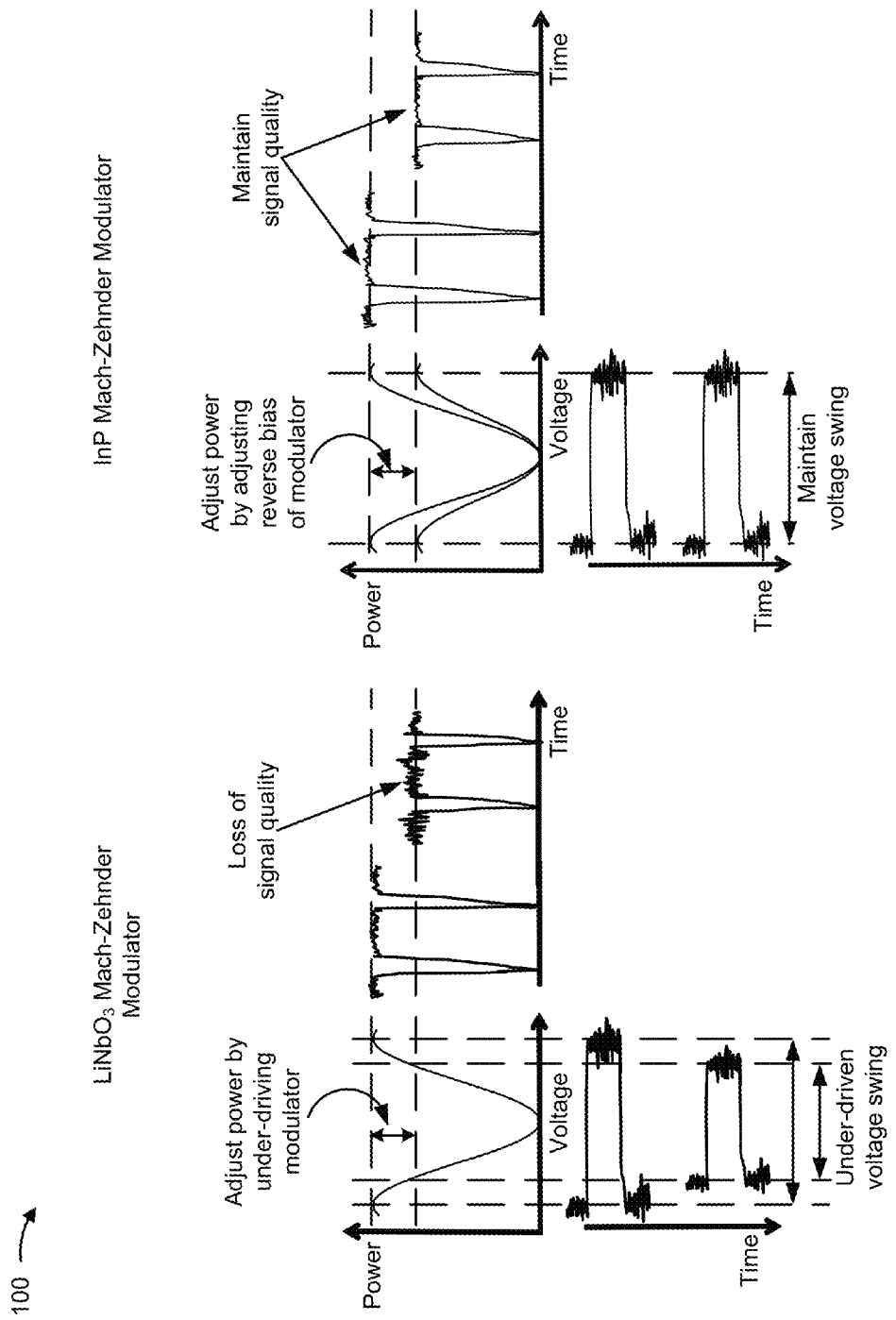

FIGS. 1A and 1B are diagrams of an overview 100 of an example implementation described herein. An optical signal may experience polarization-dependent loss ("PDL") as the signal propagates through an optical network (e.g., an optical transmitter, optical nodes, and an optical receiver connected by optical links). Each device and link in the optical network may contribute to the system-wide PDL experienced by the optical signal as it propagates through the optical network. FIG. 1A illustrates a system performance penalty (a $Q^2$ quality factor penalty) of a PM-QPSK signal under lumped system PDL with worst case polarization orientation angle to an optical receiver. As can be seen, greater than 1 decibel ("dB") penalty may occur if the overall PDL is equal to or greater than 3 dB. Polarization-dependent transmitter power variation directly contributes to the overall system PDL, and thus increases the system-level penalty. Similar penalties can be expected for signals generated using other modulation techniques, such as PM-BPSK, PM-mQAM, etc.

FIG. 1B illustrates a comparison of two techniques for adjusting and balancing the power levels of optical signals at different polarizations. In a non-semiconductor-based modulator, such as a modulator composed of $LiNbO_3$ material, the power of an optical signal may be adjusted by under-driving the modulator (e.g., by decreasing a voltage swing of an electrical signal that is used to modulate an optical signal), which may cause a loss of signal quality due to its operation away from the nonlinear clamping regime. In a technique using a semiconductor-based modulator, such as a modulator composed of InP material, the power of an optical signal may be adjusted by leveraging a reverse bias voltage of an electrical signal that is used to modulate an optical signal. Adjusting the reverse bias may adjust the power level of the optical signal, while maintaining the voltage swing and thus the signal quality.

The amount of PDL experienced by an output signal of an optical transmitter may be reduced by balancing a power level of optical signals on multiple tributaries of a modulator included in the optical transmitter. The modulator may combine optical signals from multiple tributaries, such as an I tributary and a Q tributary, and/or an X polarization tributary and a Y polarization tributary. The modulator may adjust the power level of the optical signal on each tributary by adjusting a reverse bias voltage of an electrical signal on a semiconductor-based modulator. This technique has the added benefit of maintaining signal quality by maintaining a voltage drive swing of the modulator, as opposed to the technique of under-driving the modulator, which may decrease signal quality.

Figure 2:
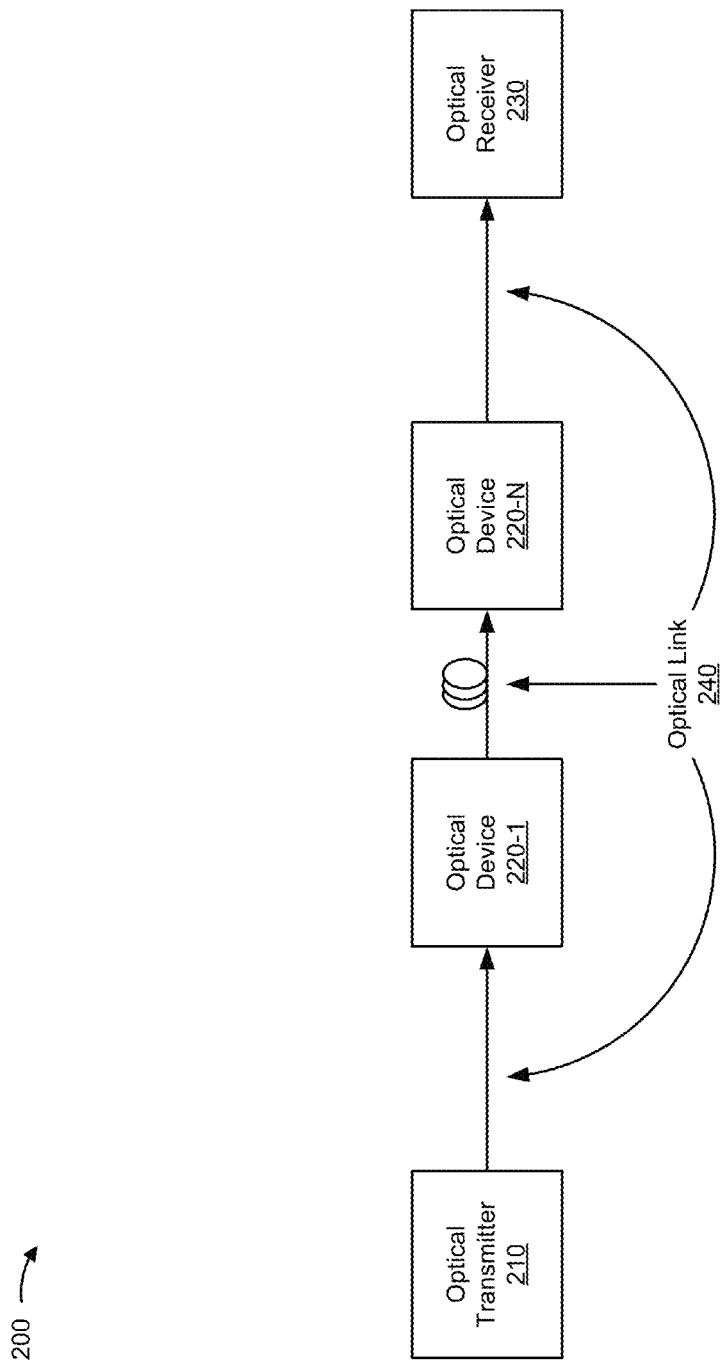
FIG. 2 is a diagram of an example environment in which systems and/or methods described herein may be implemented.

FIG. 2 is a diagram of an example environment 200 in which systems and/or methods described herein may be implemented. As illustrated, environment 200 may include an optical transmitter 210, one or more optical devices 220-1 through 220-N(N≥1) (hereinafter referred to individually as "optical device 220," and collectively as "optical devices 220"), an optical receiver 230, and an optical link 240.

Optical transmitter 210 may include a device capable of producing and/or transmitting an optical signal, such as an optical transmitter and/or an optical transceiver. For example, optical transmitter 210 may include a laser diode, a semiconductor laser, a continuous wave laser, and/or an optical modulator that may receive an electrical signal, and may convert the electrical signal into an optical signal for transmission over optical link 240. Additionally, or alternatively, optical transmitter 210 may include a device capable of modulating an optical signal. In some implementations, optical transmitter 210 may include a device capable of controlling properties associated with an optical signal and/or a modulator. Optical signals may experience polarization-dependent loss when being generated and/or transmitted by optical transmitter 210.

Optical device 220 may include one or more optical traffic processing and/or optical traffic transfer devices, such as an optical node, an optical add-drop multiplexer ("OADM"), a reconfigurable optical add-drop multiplexer ("ROADM"), an optical multiplexer, an optical demultiplexer, an optical transmitter, an optical receiver, an optical transceiver, a photonic integrated circuit, an integrated optical circuit, a computer, a server, a router, a bridge, a gateway, a modem, a firewall, a switch, a network interface card, a hub, and/or any type of device capable of processing and/or transferring optical traffic. Optical device 220 may process an optical signal and/or transmit an optical signal to another optical device 220 (and/or to optical receiver 230) via optical link 240. Optical signals may experience polarization-dependent loss when propagating through optical devices 220.

Optical receiver 230 may include a device capable of receiving an optical signal, such as an optical receiver and/or an optical transceiver. For example, optical receiver 230 may include a photodetector and/or a photodiode that may detect an optical signal received via optical link 240, and may convert the optical signal into an electrical signal. Optical signals may experience polarization-dependent loss when being received and/or processed by optical receiver 230.

Optical link 240 may include a medium capable of carrying optical signals. For example, optical link 240 may include an optical fiber that interconnects optical transmitter 210, optical devices 220, and optical receiver 230. Optical signals may experience statistical polarization-dependent loss when propagating through optical link 240.

Figure 3:
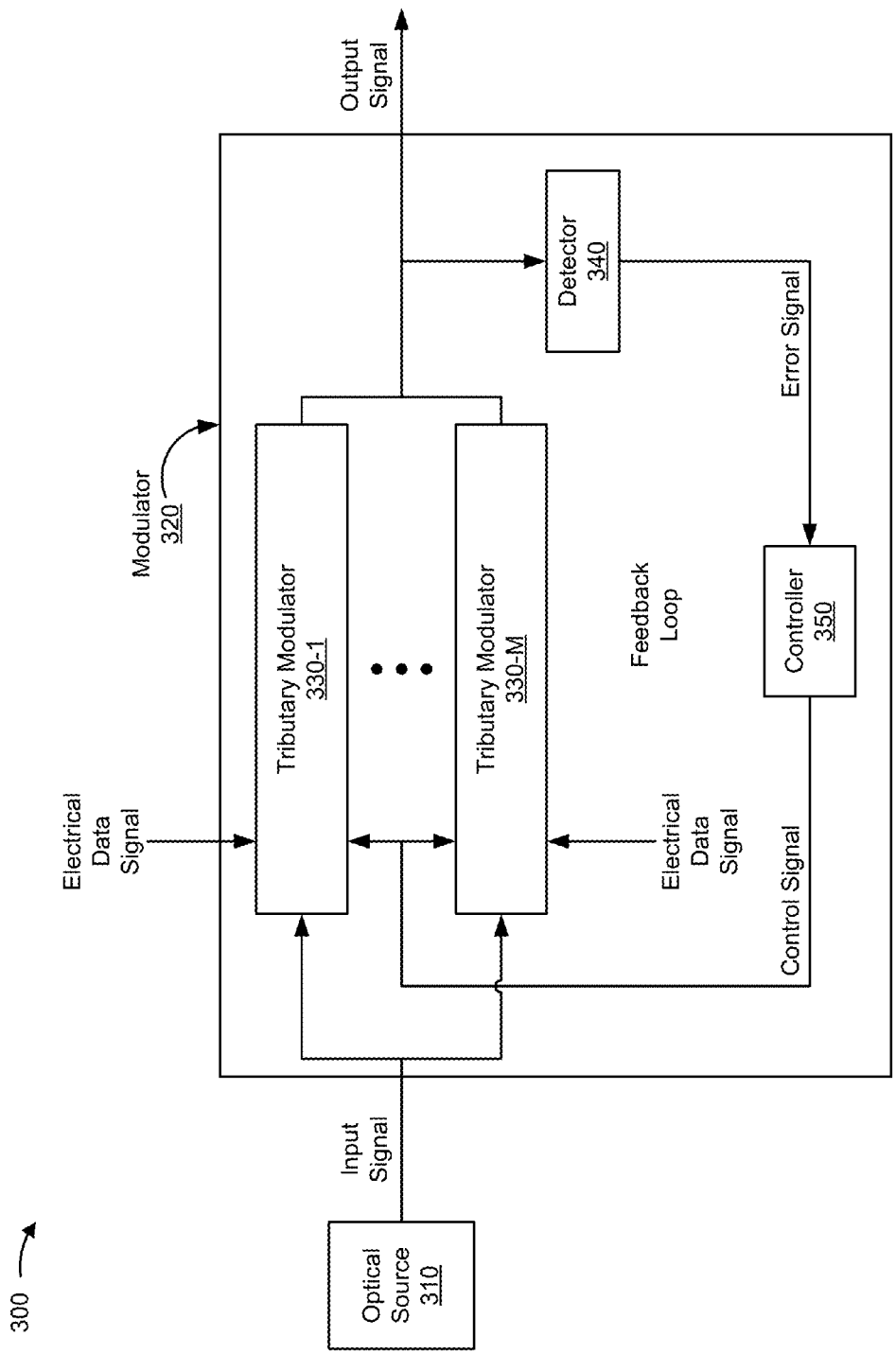
FIG. 3 is a diagram of an example device in which systems and/or methods described herein may be implemented.

FIG. 3 is a diagram of an example device 300, which may correspond to optical transmitter 210. Device 300 may include an optical source 310 and a modulator 320. Modulator 320 may include a set of tributary modulators 330-1 through 330-M (M≥1) (hereinafter referred to individually as "tributary modulator 330," and collectively as "tributary modulators 330"), a detector 340, and a controller 350.

Optical source 310 may include a device capable of producing and/or transmitting an optical signal. For example, optical source 310 may include a laser diode, a semiconductor laser, and/or a continuous wave laser.

Modulator 320 may include a device capable of generating an optical signal. For example, modulator 320 may produce a modulating signal, which may vary one or more properties (e.g., amplitude/intensity, phase, frequency/wavelength, polarization, etc.) of a carrier signal (e.g., a carrier wave) produced by optical source 310. In some implementations, modulator 320 may include a polarization splitter, a polarization combiner, and/or a polarization rotator. Additionally, or alternatively, modulator 320 may include an indium phosphide semiconductor-based modulator. Additionally, or alternatively, modulator 320 may include a Mach-Zehnder ("MZ") modulator, an electro-absorption modulator, a phase modulator, an intensity modulator (e.g., an OOK modulator), a BPSK modulator, a QPSK modulator, a DQPSK modulator, a QAM modulator, an M-QAM modulator, any polarization multiplexed (PM) versions of the above listed modulators, and/or any other modulator or combination of modulators.

Tributary modulator 330 may include a device and/or circuitry capable of modulating an optical signal. For example, tributary modulator 330 may receive an input signal from optical source 310, and may modulate the input signal with an electrical data signal. Additionally, or alternatively, tributary modulator 330 may receive a control signal via a feedback loop, and may adjust the operating condition of the modulator using the control signal. For example, tributary modulator 330 may combine the data signal and the control signal to modulate the input signal. Tributary modulator 330 may tap off the modulated signal to a monitor photo-detector 340.

Modulator 320 may include multiple tributary modulators 330, and the signals generated by each tributary modulator 320 may be combined by modulator 320 to produce an output signal. For example, modulator 320 may include a QAM modulator with two tributary modulators 330, one to modulate signals on the I channel, and one to modulate signals on the Q channel. Modulator 320 may combine the signals on the I and Q channels to generate the output signal. Additionally, or alternatively, modulator 320 may include a PM modulator with two tributary modulators 330, one to modulate signals at the X polarization, and one to modulate signals at the Y polarization. Modulator 320 may combine the signals at the X and Y polarizations to generate the output signal. Modulator 320 may be referred to herein as a "parent modulator" that combines signals from two or more tributary modulators 330.

Additionally, or alternatively, multiple modulators 320 may be nested so that the output signal of a particular modulator 320 is included in the output signal for another modulator 320. For example, a combined output signal from an I modulator and a Q modulator may produce the output signal of an X modulator, an output signal from an I modulator and a Q modulator may produce the output signal of a Y modulator, and the outputs from the X modulator and the Y modulator may be combined into an output signal of a PM modulator to be transmitted over an optical network, as described in more detail below in connection with FIG. 4.

Detector 340 may include a device and/or circuitry capable of detecting a form of error signal in a modulated optical signal. In some implementations, detector 340 may detect an error in a modulated signal generated by a tributary modulator 330. Additionally, or alternatively, detector 340 may detect an error based on multiple modulated signals generated by multiple tributary modulators 330. In some implementations, the multiple modulated signals may be combined before being transmitted to detector 340. Detector 340 may pass an error signal, based on the detected error, to a controller 350.

Controller 350 may include a device and/or circuitry capable of controlling properties of tributary modulator 330 and/or a signal generated by tributary modulator 330. In some implementations, controller 350 may control the properties using a feedback loop. For example, controller 350 may receive an error signal from detector 340, and may generate a control signal, based on the error signal, to control the properties of tributary modulator 330 and/or a signal generated by tributary modulator 330. For example, the error signal may be a power difference between signals produced by each tributary modulator 330, and the control signal may be a reverse bias of each tributary modulator 330.

The control signal may be transmitted to tributary modulator 330, may be combined with the data signal, and may be used to modulate the input signal. Example properties that may be controlled using the control signal include a bias point of tributary modulator 330, a phase difference between signals produced by multiple tributary modulators 330, a polarization orthogonality of signals produced by multiple tributary modulators 330, a voltage swing used by tributary modulator 330 to generate a signal, or other properties of one or more optical signals and/or one or more tributary modulators 330.

Figure 4:
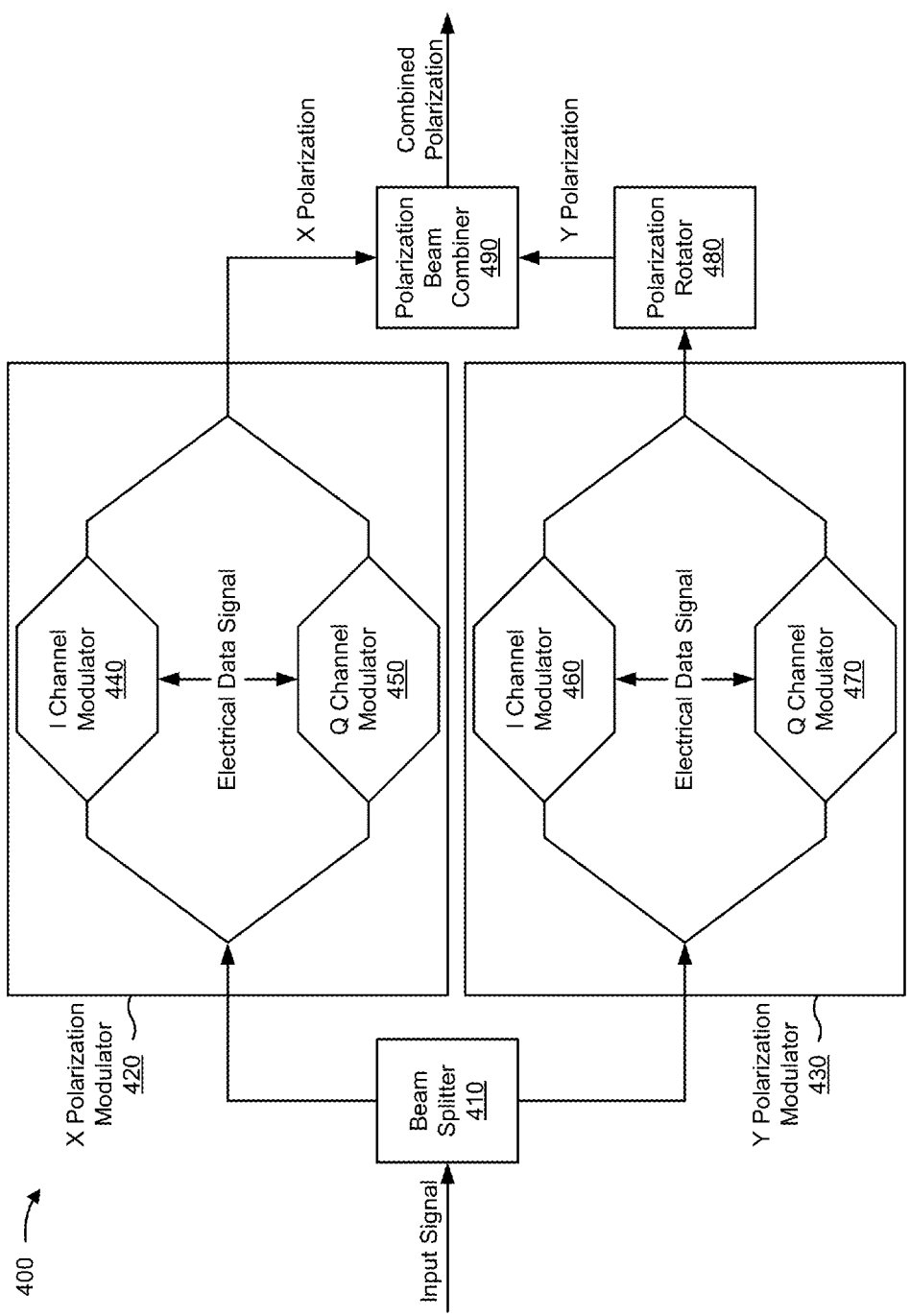
FIG. 4 is a diagram of another example device in which systems and/or methods described herein may be implemented.

FIG. 4 is a diagram of another example device 400 in which systems and/or methods described herein may be implemented. For example, device 400 may correspond to a PM-mQAM modulator. Device 400 may include a beam splitter 410, an X polarization modulator 420, a Y polarization modulator 430, a polarization rotator 480, and a polarization beam combiner 490. X polarization modulator 420 may include an I channel modulator 440 and a Q channel modulator 450. Y polarization modulator 430 may include an I channel modulator 460 and a Q channel modulator 470.

In some embodiments, device 400 may correspond to modulator 320, and X polarization modulator 420 and Y polarization modulator 430 may correspond to tributary modulators 330. Additionally, or alternatively, X polarization modulator 420 may correspond to modulator 320, and I channel modulator 440 and Q channel modulator 450 may correspond to tributary modulators 330. Additionally, or alternatively, Y polarization modulator 430 may correspond to modulator 320, and I channel modulator 460 and Q channel modulator 470 may correspond to tributary modulators 330.

Device 400 may receive an input optical signal (e.g., a lightbeam), which may be received by beam splitter 410. Beam splitter 410 may split the input optical signal into (at least) two paths. X polarization modulator 420 and Y polarization modulator 430 may each receive an optical signal on one of the paths, and may modulate each optical signal using an electrical driving signal (illustrated as "data signal") using modulators 440-470 to each produce an output optical signal. The output optical signal from at least one of the paths (e.g., from Y polarization modulator 430) may be rotated to a particular polarization by polarization rotator 480. Polarization rotator 480 may rotate the output optical signal from at least one of the paths such that the output signal from X polarization modulator 420 and the output signal from Y polarization modulator 430 are orthogonal (or approximately orthogonal). Polarization beam combiner 490 may combine the orthogonal modulated optical signals to produce an optical signal with a combined polarization.

Device 400 may combine four signals to generate the output signal: one signal on the I channel of the X polarization (e.g., generated via I channel modulator 440 from X polarization modulator 420), one signal on the Q channel of the X polarization (e.g., generated via Q channel modulator 450 from X polarization modulator 420), one signal on the I channel of the Y polarization (e.g., generated via I channel modulator 460 from Y polarization modulator 430), and one signal on the Q channel of the Y polarization (e.g., generated via Q channel modulator 470 from Y polarization modulator 430).

Figure 5A:
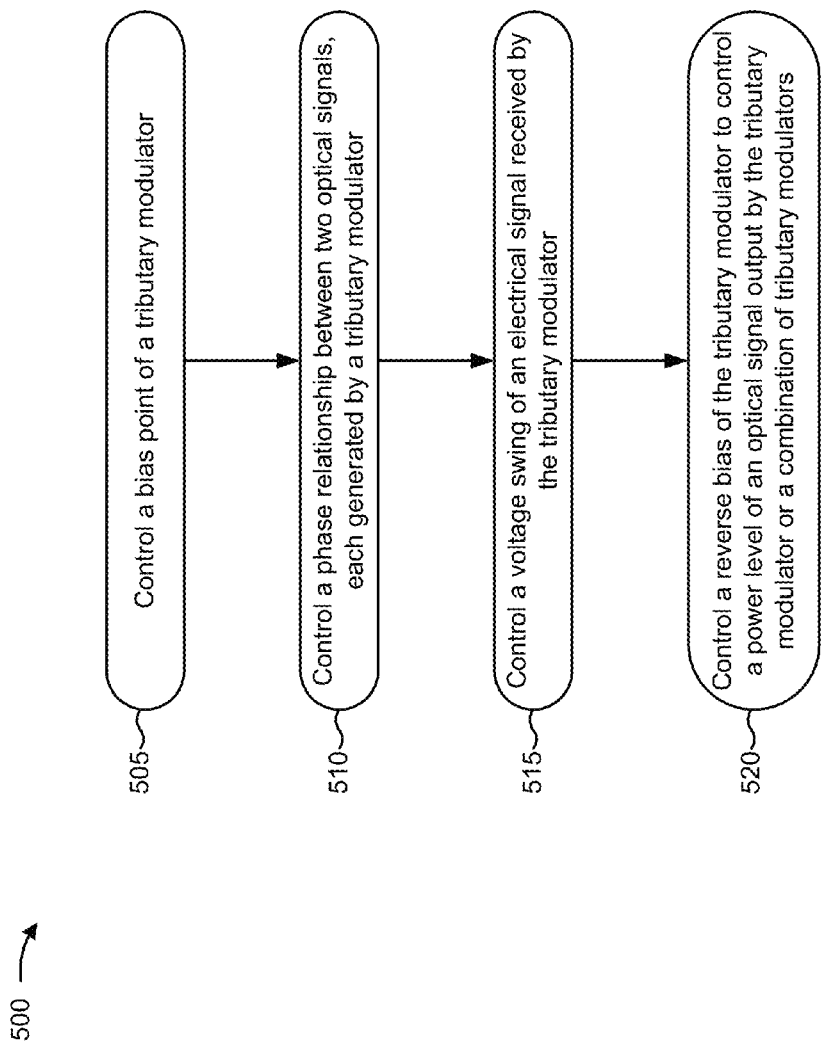
FIGS. 5A and 5B are flow charts of an example process for minimizing polarization-dependent transmitter power according to an implementation described herein.

FIG. 5A is a diagram of an example process 500 for minimizing polarization-dependent loss according to an implementation described herein. In some implementations, one or more process blocks of FIG. 5A may be performed by device 400. In some other implementations, one or more process blocks of FIG. 5A may be performed by one or more components of another device (e.g., modulator 320) or a collection of devices, such as one or more of the modulators described herein.

As shown in FIG. 5A, process 500 may include controlling a bias point of a tributary modulator (block 505). A bias point may represent an operating point of tributary modulator 330. For example, the bias point may be at a null bias to generate mQAM modulation formats using tributary modulator 330 or a combination of tributary modulators 330. Additionally, or alternatively, the bias point may be at a quadrature bias point to generate OOK modulation format using tributary modulator 330. Controller 350 may control the bias point of one or more tributary modulators and/or one or more parent modulators.

Controller 350 may control a bias point by maintaining the bias point at a specific point on a modulation transfer function associated with tributary modulator 330. The modulation transfer function may represent the optical power of a signal output by tributary modulator 330 as a function of the voltage applied across tributary modulator 330. When not controlled, the modulation transfer function may change (e.g., may drift under environmental change), which may result in a less than optimal power level of a signal output by tributary modulator 330. In some implementations, controller 350 may maintain a bias of tributary modulator 330 at a particular transmission and/or bias point (e.g., a null (minimum) transmission and/or bias point, a quadrature (half) transmission and/or bias point, a full (maximum) transmission and/or bias point, etc.) associated with tributary modulator 330 using a feedback loop. For example, controller 350 may ensure that the output of tributary modulator 330 is zero (e.g., null) when no input electrical signal is applied to tributary modulator 330. For example, referring to FIG. 4, controller 350 may control a bias point of I channel modulator 440, Q channel modulator 450, I channel modulator 460, and/or Q channel modulator 470.

As further shown in FIG. 5A, process 500 may include controlling a phase relationship between two optical signals, each generated by a tributary modulator (block 510). In some implementations, controller 350 may maintain a phase relationship of two optical signals combined by modulator 320 at a quadrature phase (e.g., ninety degrees, 90°, $\pi/2$, etc.) using a feedback loop. For example, the two optical signals may include a first optical signal on the I channel and a second optical signal on the Q channel. Controller 350 may control the phase difference between signals output from two or more tributary modulators and/or two or more parent modulators.

For example, referring to FIG. 4, controller 350 may control a phase relationship between a signal generated by I channel modulator 440 and a signal generated by Q channel modulator 450. Additionally, or alternatively, controller 350 may control a phase relationship between a signal generated by I channel modulator 460 and a signal generated by Q channel modulator 470.

As still further shown in FIG. 5A, process 500 may include controlling a voltage swing of an electrical signal received by the tributary modulator (block 515). For example, controller 350 may control a voltage swing of an electrical signal. The electrical signal may be an electrical data driving signal, and tributary modulator 330 may use the electrical signal to modulate an optical signal with different power level and signal quality based on the voltage swing of the electrical signal. Controller 350 may control the voltage swing at a nominal level, thus keeping the signal quality of output optical signals intact. Controller 350 may control the voltage swing associated with one or more tributary modulators and/or one or more parent modulators.

A voltage swing may represent a relationship (e.g., a difference) between a maximum positive output voltage and a maximum negative output voltage used to control an electrical signal. For example, if the maximum positive output voltage of a tributary modulator 330 is $+1V_\pi$, where $V_\pi$ is the voltage swing required to obtain a $\pi$ phase shift, and the maximum negative output voltage of the tributary modulator 330 is $-1V_\pi$, then the voltage swing is equal to $2V_\pi$. In some implementations, controller 350 may maintain a voltage swing of tributary modulator 330 at a nominal and/or predetermined value (e.g., $2V_\pi$). Additionally, or alternatively, controller 350 may maintain a voltage swing of tributary modulator 330 between a first predetermined voltage and a second predetermined voltage based on a function (e.g., a sine function, a cosine function, a periodic function, etc.). A voltage associated with the voltage swing may be used by tributary modulator 330 to produce a modulated signal. In some implementations, controller 350 may control the voltage swing of the modulator using a control circuit, as discussed below in connection with FIG. 6.

For example, referring to FIG. 4, controller 350 may control a voltage swing of the data signal received by I channel modulator 440, Q channel modulator 450, I channel modulator 460, and/or Q channel modulator 470. Controller 350 may maintain the voltage swings of the electrical signal into each tributary modulator at a nominal level. Controller 350 may ensure that the voltage swing is not leveraged for optical power leveling, thus keeping the output optical signal quality intact.

As still further shown in FIG. 5A, process 500 may include controlling a reverse bias of the tributary modulator to control a power level of an optical signal output by the tributary modulator or a combination of tributary modulators (block 520). For example, controller 350 may control a reverse bias voltage, of modulator 320 (and/or tributary modulator 330). Modulator 320 may use the electrical signal to modulate an optical signal based on the reverse bias voltage of the electrical signal. Controller 350 may control the reverse bias voltage associated with one or more tributary modulators and/or one or more parent modulators.

In some implementations, controller 350 may set the reverse bias for modulator 320 (e.g., X polarization modulator 420 and/or Y polarization modulator 430) based on a wavelength of an optical signal generated by modulator 320, a polarization orientation of the optical signal generated by modulator 320, a length of a waveguide via which the optical signal is to be transmitted, an insertion loss associated with the optical signal, or other properties of the optical signal and/or modulator 320. For example, controller 350 may use information stored in memory (e.g., via a look-up table and/or a function stored in a memory associated with controller 350, etc.) to set the reverse bias of modulator 320 based on the properties of the optical signal generated by modulator 320.

In some implementations, controller 350 may set the reverse bias for modulator 320 using a feedback loop. For example, the feedback loop may minimize a transmission power relationship (e.g., a difference, a ratio, etc.) between a signal generated by a particular modulator 320 and a signal generated by another modulator 320 (e.g., between a signal produced by X polarization modulator 420 and a signal produced by Y polarization modulator 430). A transmission power may represent an amplitude and/or an intensity of an optical signal produced by modulator 320.

In some implementations, controller 350 may minimize the transmission power relationship (e.g., may equalize the transmission power) of signals generated by multiple tributary modulators 330 and/or modulators 320 (e.g., two modulators, four modulators, etc.). In some implementations, controller 350 may minimize the difference in power between the optical signals using a vector signal analyzer. Additionally, or alternatively, controller 350 may minimize the difference in power between the optical signals using a control circuit, as discussed below in connection with FIG. 7.

For example, referring to FIG. 4, controller 350 may control a reverse bias used by X polarization modulator 420 and a reverse bias used by Y polarization modulator 430 independently, such that the output optical power on each polarization is balanced.

Figure 5B:
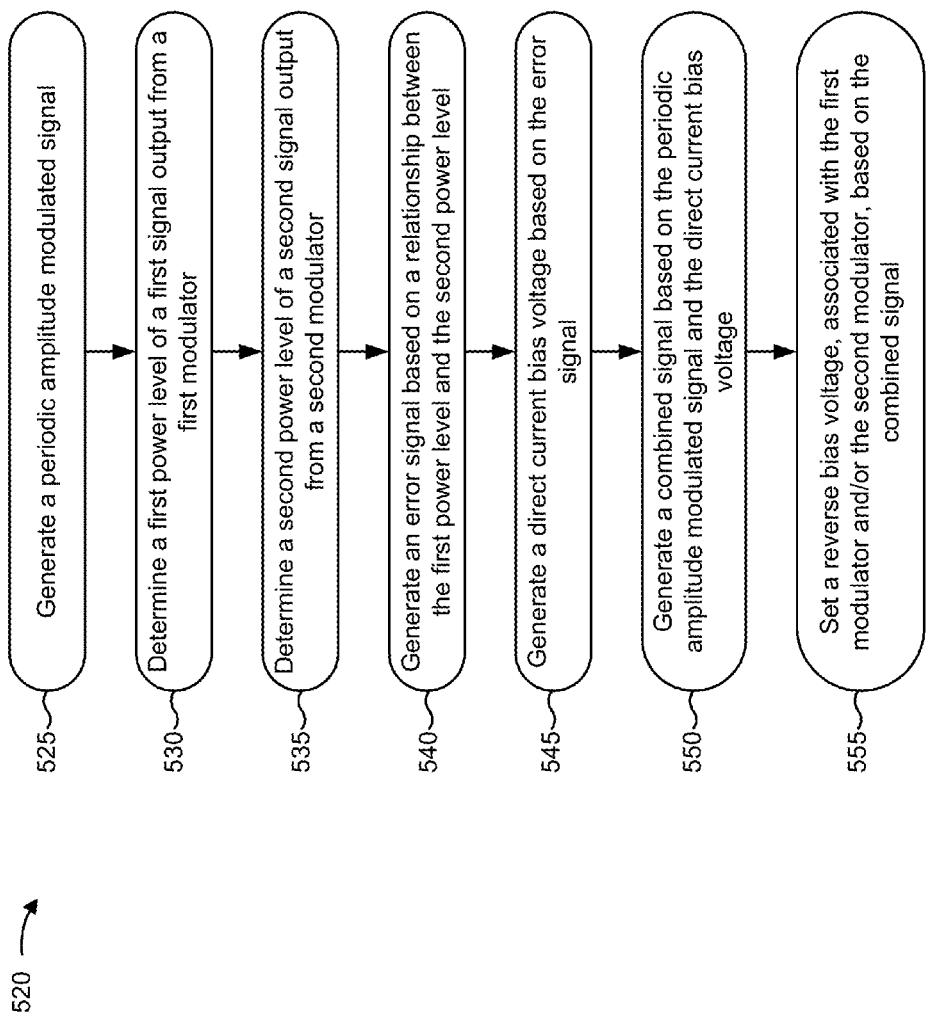

Process block 520 may include the process blocks shown in FIG. 5B. As shown in FIG. 5B, process block 520 may include generating a periodic amplitude modulated signal (block 525). For example, controller 350 may generate a periodic amplitude modulated signal (e.g., an alternating current (AC) bias voltage) at a particular frequency.

As shown in FIG. 5B, process block 520 may include determining a first power level of a first signal output from a first modulator (block 530), and determining a second power level of a second signal output from a second modulator (block 535). For example, the first and second signals may be optical signals output from a modulator (e.g., a tributary modulator, an IQ modulator, etc.). In some implementations, the first and second signals may be associated with the same polarization orientation (e.g., a tributary modulator for the I channel and a tributary modulator for the Q channel). Alternatively, the first and second signals may be associated with different polarization orientations (e.g., polarization orientations that are orthogonal or approximately orthogonal). In some implementations, the first and second modulators may include two or more tributary modulators (e.g., IQ modulators).

As further shown in FIG. 5B, process block 520 may include generating an error signal based on a relationship between the first power level and the second power level (block 540). For example, detector 340 may determine a relationship between the first and second power levels, such as a difference between the first and second power levels, a ratio between the first and second power levels, etc., and may generate an error signal based on the relationship. Detector 340 may generate the error signal based on the magnitude of the relationship (e.g., the magnitude of the difference and/or the ratio between the power levels).

As further shown in FIG. 5B, process block 520 may include generating a direct current (DC) bias voltage based on the error signal (block 545), generating a combined signal based on the periodic amplitude modulated signal and the direct current bias voltage (block 550), and setting a reverse bias voltage, associated with the first modulator and/or the second modulator, based on the combined signal (block 555). For example, controller 350 may generate a direct current bias voltage based on the error signal (e.g., based on the magnitude and/or value of the error signal), and may combine the bias voltage signal with the periodic amplitude modulated signal. Controller 350 may use the combined signal to set a reverse bias voltage of the first and/or second modulator.

The reverse bias voltage may be used by the modulator to control the first power level of the first signal and/or the second power level of the second signal. Controller 350 may decrease and/or minimize a difference and/or ratio between the first and second power levels. In some implementations, controller 350 may control a reverse bias associated with one of the first modulator or the second modulator. Alternatively, controller 350 may control a first reverse bias associated with the first modulator, and may control a second reverse bias associated with the second modulator.

While a series of blocks have been described with regard to FIGS. 5A and 5B, the order of the blocks may be modified in some implementations. Additionally, or alternatively, non-dependent blocks may be performed in parallel.

Figure 6:
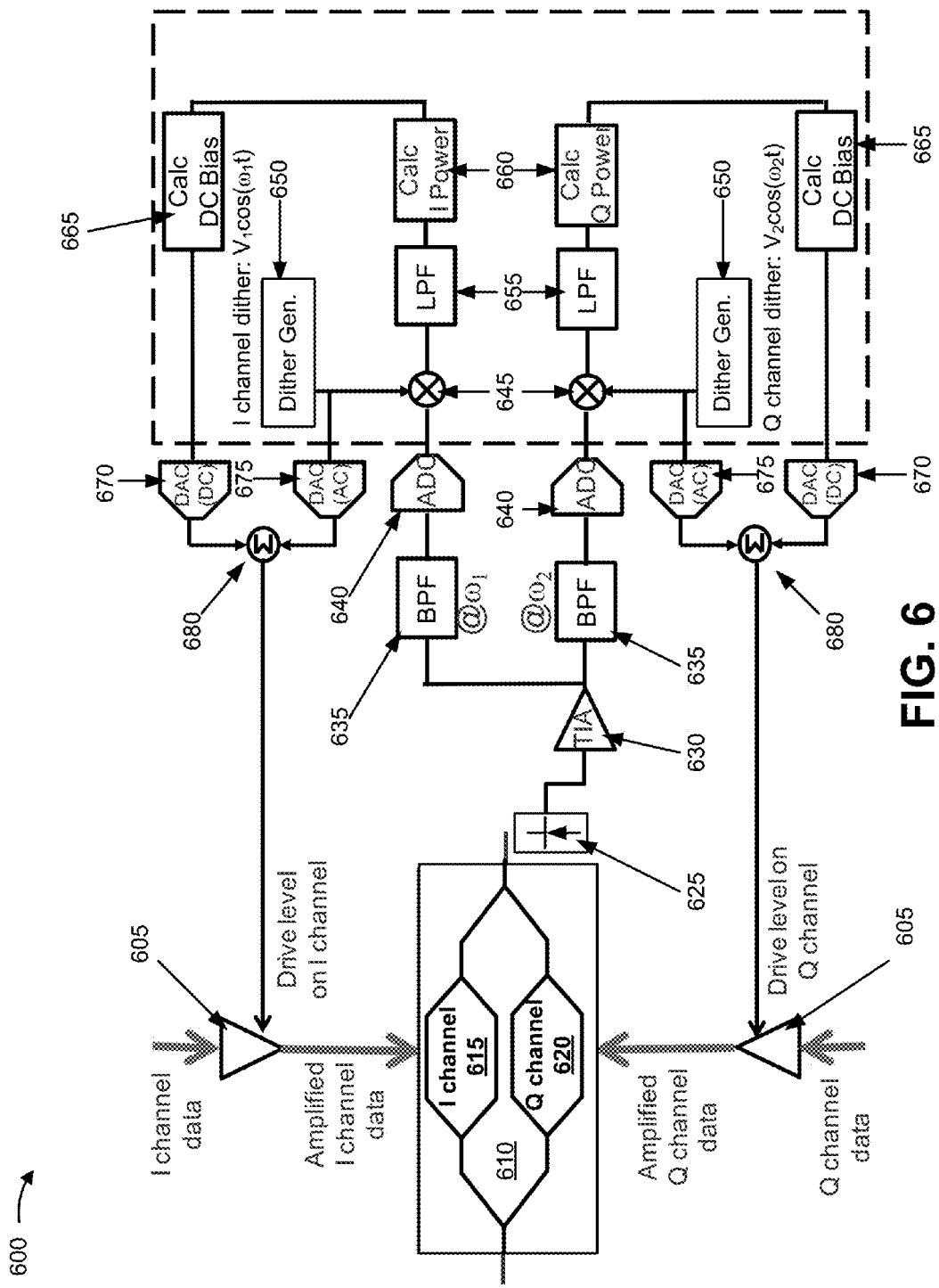
FIG. 6 is a diagram of an example circuit for maintaining nominal electrical voltage drive swing of an optical modulator under closed loop control, according to some implementations.

FIG. 6 is a diagram of an example circuit 600 for maintaining nominal electrical voltage drive swing of an optical modulator under closed loop control, according to some implementations. As illustrated in FIG. 6, circuit 600 may include drivers 605, modulator 610 (e.g., an IQ modulator), I channel modulator 615, Q channel modulator 620, photo-detector 625, transimpedance amplifier 630 ("TIA 630"), band pass filters 635 ("BPFs 635"), analog-to-digital converters 640 ("ADCs 640"), electrical signal combiners 645, dither generators 650, low pass filters 655 ("LPFs 655"), power level calculators 660, bias calculators 665, direct current (DC) digital-to-analog converters 670 ("DC DACs 670"), alternating current (AC) digital-to-analog converters 675 ("AC DACs 675"), and summation networks 680. In some implementations, modulator 610 may correspond to modulator 320 (FIG. 3), I channel modulator 615 and Q channel modulator 620 may correspond to tributary modulators 330 (FIG. 3), and elements of circuit 600 may correspond to detector 340 and controller 350 (FIG. 3).

Circuit 600 may be used to set the output voltage swing of driver 605. Driver 605 may receive and amplify a data signal, such as an electrical signal on the I channel or the Q channel, which may imprint on tributary modulators 615 and 620 to generate respective optical signals to be passed on to photo-detector 625. Photo-detector 625 may convert the optical signal into a baseband electrical signal. In some implementations, TIA 630 may amplify the baseband electrical signal. In another implementation, photo-detector 625 may amplify the baseband electrical signal without using TIA 630. In yet another implementation, the electrical signal may not need amplification, and TIA 630 may not be included in circuit 600. In some implementations, TIA 630 may have an optical to electrical bandwidth higher than dither frequencies $\omega_1$ and $\omega_2$.

BPFs 635 may filter the baseband electrical signal at the dither frequencies, $\omega_1$ and $\omega_2$, to pick out the I and Q channels, respectively. ADC 640 may digitize the correspondingly filtered baseband electrical signal to generate a digital signal representative of the (analog) baseband electrical signal. Electrical signal combiner 645 may combine (e.g., via multiplication) the digital signal with a dither signal generated by dither generator 650 in order to down-convert the digital signal to baseband LPF 655 may filter the mixed signal to down-convert the digital signal to baseband and to improve the signal to noise ratio of the combined signal, and power level calculator 660 may calculate the optical power of the filtered signal (e.g., on the I or Q tributary). Bias calculator 665 may use the calculated optical power, output from power level calculator 660, to calculate a DC bias (e.g., the DC value of the voltage swing bias) for driver 605. DC DAC 670 may convert the DC bias to an analog DC bias voltage, and AC DAC 675 may convert the dither signal from dither generator 650 to an AC bias dither tone. Summation network 680 may combine the DC bias voltage and the AC bias voltage. The output voltage swing of driver 605 may be set using the combined DC and AC bias voltages output by summation network 680.

In some implementations, the combined DC and AC bias may be used to set the output stage drain voltage of driver 605 such that the drive level is controlled and dithered. For example, circuit 600 may independently modulate, vary, and/or dither the drive level of the I modulator and the Q modulator with known and unique frequencies (e.g., $\omega_1$ and $\omega_2$) and independently controllable amplitudes (e.g., modulation depths $V_1$ and $V_2$), using dither generators 650 and AC DACs 675. The dithered bias voltage may produce a dither on an optical carrier passing through modulator 610, with a dither frequency based on the dithered bias voltage (e.g., substantially similar to the electrical dither). By minimizing the output power variation at dither frequencies $\omega_1$ and $\omega_2$, drive levels on the I and Q tributaries can be maintained at a nominal swing.

The signals on the I and Q tributaries may be combined by modulator 610, and may be transmitted to modulator 705 to minimize polarization-dependent loss, as discussed below in connection with FIG. 7.

For explanatory purposes, the path of a signal on one tributary is described in some portions above in connection with FIG. 6. A signal on another tributary may traverse a similar path, for example, after being filtered by BPF 635. Furthermore, FIG. 6 depicts a circuit that controls the swing voltage of signals generated on the I tributary and the Q tributary for a single polarization (e.g., the X polarization) for simplicity. The swing voltage of signals generated on the I tributary and the Q tributary for another polarization (e.g., the Y polarization) may be controlled in the same or a similar manner.

The circuit components illustrated in FIG. 6 are provided as an example. In some implementations, circuit 600 may include additional circuit components, fewer circuit components, different circuit components, or differently arranged circuit components than those illustrated in FIG. 6. For example, a single DAC may be used, instead of a separate AC DAC and DC DAC, by digitally combining the AC and DC components. In some implementations, dither generators 650 may generate dither signals at a common frequency rather than different frequencies (e.g., $\omega_1$ and $\omega_2$), and may use time division multiplexing to assign a time slot to each dither, in order to minimize interference with other dithers in other time slots.

While a combination of analog and digital circuits are shown in FIG. 6 as an example, circuit 600 may be implemented using a fully analog circuit or a fully digital circuit. Additionally, the functions performed by circuit components 605-680 may be performed using any combination of analog and/or digital components. Additionally, or alternatively, the functions described as being performed by one component illustrated in FIG. 6 may be performed by one or more other components illustrated in FIG. 6 and/or one or more other components not illustrated in FIG. 6.

Figure 7:
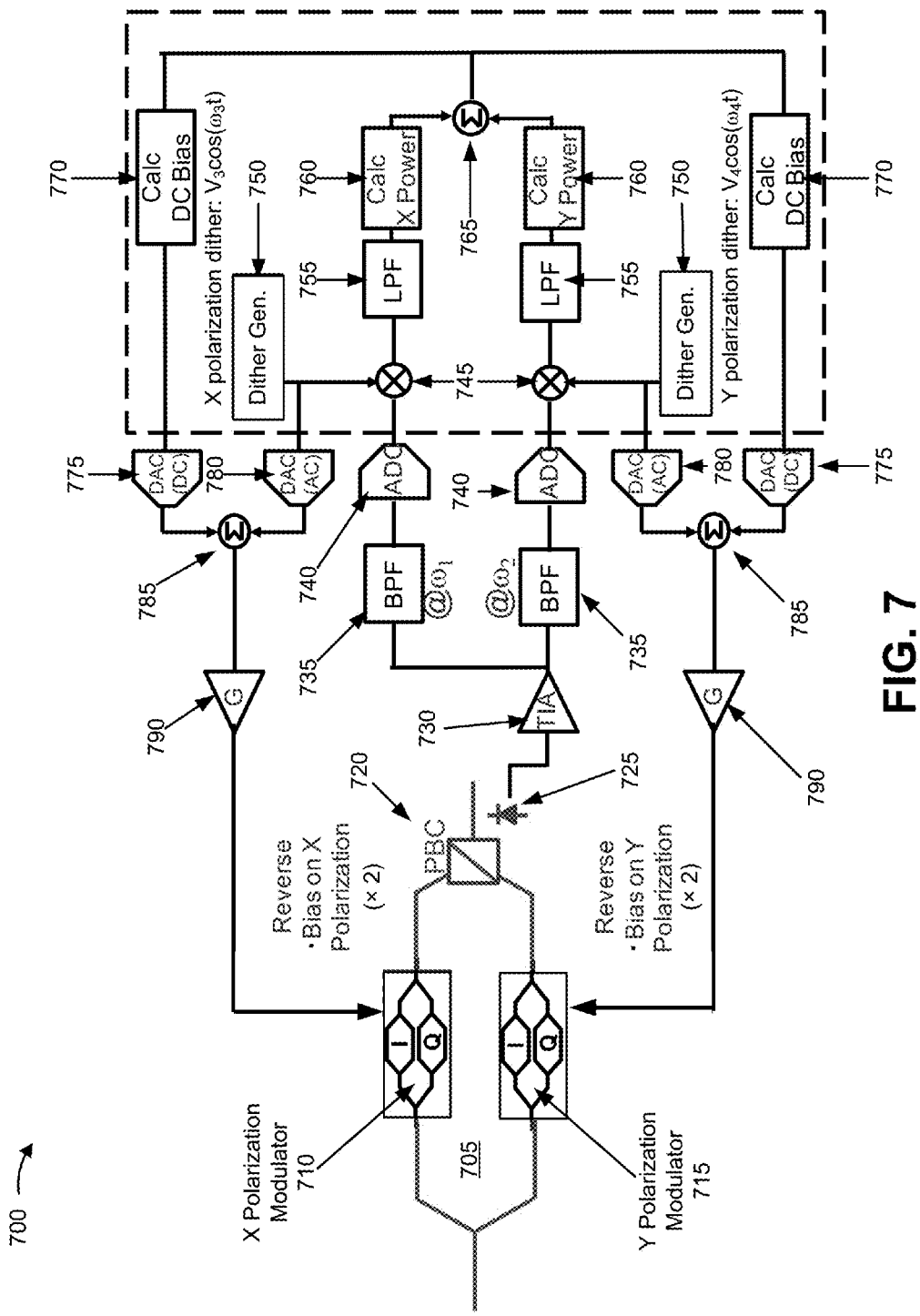
FIG. 7 is a diagram of an example circuit for minimizing polarization-dependent power in an optical transmitter by controlling the reverse bias of a semiconductor modulator, according to some implementations.

FIG. 7 is a diagram of an example circuit 700 for minimizing polarization-dependent loss in an optical transmitter by controlling the reverse bias of a semiconductor-based modulator, according to some implementations. As illustrated in FIG. 7, circuit 700 may include modulator 705 (e.g., a PM modulator), X polarization modulator 710, Y polarization modulator 715, polarization beam combiner 720 ("PBC 720"), photo-detector 725, transimpedance amplifier 730 ("TIA 730"), band pass filters 735 ("BPFs 735"), analog-to-digital converters 740 ("ADCs 740"), electrical signal combiners 745, dither generators 750, low pass filters 755 ("LPFs 755"), power level calculators 760, summation network 765, bias calculators 770, direct current digital-to-analog converters 775 ("DC DACs 775"), alternating current digital-to-analog converters 780 ("AC DACs 780"), summation networks 785, and amplifiers 790. In some implementations, modulator 705 may correspond to modulator 320 (FIG. 3), X polarization modulator 710 and Y polarization modulator 715 may correspond to tributary modulators 330 (FIG. 3), and elements of circuit 700 may correspond to detector 340 and/or controller 350 (FIG. 3).

Circuit 700 may be used to dither the reverse bias voltage of the X tributary and the Y tributary of modulator 705. The X modulator 710 and Y modulator 715 may use the dithered reverse bias voltage to produce a dither on an optical carrier passing through X modulator 710 and Y modulator 715, respectively. PBC 720 may combine the optical carriers passing through X modulator 710 and Y modulator 715 to produce a polarization multiplexed optical signal. Photo-detector 725 may convert the combined optical carrier into a baseband electrical signal. In some implementations, TIA 730 may amplify the baseband electrical signal. In another implementation, photo-detector 725 may amplify the baseband electrical signal without using TIA 730. In yet another implementation, the electrical signal may not need amplification, and TIA 730 may not be included in circuit 700. In some implementations, TIA 730 may have an optical to electrical bandwidth higher than dither frequencies $\omega_3$ and $\omega_4$.

BPFs 735 may filter the baseband electrical signal at the dither frequencies, $\omega_1$ and $\omega_2$, for the X and Y polarizations, respectively. ADC 740 may digitize a baseband electrical signal to generate a digital signal representative of the (analog) split baseband electrical signal. Signal combiner 745 may mix (e.g., via multiplication) the digital signal with a dither signal generated by dither generator 750 in order to down-convert the digital signal to baseband LPF 755 may filter the mixed signal to down-convert the digital signal to baseband and to improve the signal to noise ratio of the combined signal, and power level calculator 760 may calculate the optical power of the filtered signal (e.g., on the X or Y tributary). Summation network 765 may combine (e.g., via subtraction) the calculated optical power values from a filtered signal on each tributary (X and Y), and may generate an error signal based on the difference in calculated optical power values. Bias calculator 770 may use the error signal to calculate a DC bias (e.g., the DC value of the voltage swing bias) for a reverse bias of a tributary modulator. In some implementations, bias calculator 770 may use an algorithm (e.g., a steepest descent algorithm) in order to adjust the reverse bias voltage so that the difference in power between a signal on the X polarization and a signal on the Y polarization is maintained (e.g., at zero dB).

DC DAC 775 may convert the DC bias to an analog DC bias voltage, and AC DAC 780 may convert the dither signal from dither generator 750 to an AC bias voltage. Summation network 785 may combine the DC bias voltage and the AC bias voltage. The reverse bias of a tributary modulator (e.g., X or Y) may be set using the combined DC and AC bias voltages output by summation network 785. In some implementations, amplifier 790 may amplify the combined DC and AC bias voltages before applying the combined voltages to the reverse bias voltage of the tributary modulator.

In some implementations, the combined DC and AC bias voltages may be used to set the reverse bias voltage of a tributary modulator 710/715, such that the reverse bias voltage is controlled and dithered. For example, circuit 700 may independently modulate, vary, and/or dither the reverse bias voltage on the X and Y tributaries with known and unique frequencies (e.g., $\omega_3$ and $\omega_4$) and independently controllable amplitudes (e.g., modulation depths $V_3$ and $V_4$), using dither generators 750 and AC DACs 780. The dithered reverse bias voltage may produce a dither on an optical carrier passing through modulator 705, with a dither frequency based on the dithered reverse bias voltage (e.g., substantially similar to the electrical dither). In some implementations, the reverse bias voltage may be provided via single-ended electrodes and/or differential electrodes.

For explanatory purposes, the path of a signal on one tributary is described in some portions above in connection with FIG. 7. A signal on another tributary may traverse a similar path, for example, after being filtered by BPF 735.

The circuit components illustrated in FIG. 7 are provided as an example. In some implementations, circuit 700 may include additional circuit components, fewer circuit components, different circuit components, or differently arranged circuit components than those illustrated in FIG. 7. For example, a single DAC may be used, instead of a separate AC DAC and DC DAC, by digitally combining the AC and DC components. In some implementations, dither generators 750 may generate dither signals at a common frequency rather than different frequencies (e.g., $\omega_3$ and $\omega_4$), and may use time division multiplexing to assign a time slot to each dither, in order to minimize interference with other dithers in other time slots.

While a combination of analog and digital circuits are shown in FIG. 7 as an example, circuit 700 may be implemented using a fully analog circuit or a fully digital circuit. Additionally, the functions performed by circuit components 705-790 may be performed using any combination of analog and/or digital components. Additionally, or alternatively, the functions described as being performed by one component illustrated in FIG. 7 may be performed by one or more other components illustrated in FIG. 7 and/or one or more other components not illustrated in FIG. 7.

Due to potential imbalances among electrical driving signals and optical waveguide structures, the optical power per polarization at the output of a transmitter may exhibit differences. This polarization dependent impairment is detrimental to the overall system performance and thus requires minimization. Implementations described herein may increase overall system performance by minimizing the detrimental effects of polarization dependent impairments.

The foregoing disclosure provides illustration and description, but is not intended to be exhaustive or to limit the embodiments to the precise form disclosed. Modifications and variations are possible in light of the above disclosure or may be acquired from practice of the embodiments.

As used herein, the term "component" is intended to be broadly construed as hardware, firmware, or a combination of hardware and software.

Certain figures described herein illustrate a number of devices and/or components, including FIGS. 2-4. The number of devices and/or components shown in FIGS. 2-4 are provided for explanatory purposes. In practice, there may be additional devices and/or components, fewer devices and/or components, different devices and/or components, or differently arranged devices and/or components than are shown in FIGS. 2-4. Additionally, or alternatively, two or more of the devices and/or components shown in FIGS. 2-4 may be implemented within a single device and/or component, or a single device and/or component shown in FIGS. 2-4 may be implemented as multiple, distributed devices and/or components. Additionally, or alternatively, one or more of the devices and/or components shown in FIGS. 2-4 may perform one or more functions described as being performed by another one or more of the devices shown in FIGS. 2-4. In some implementations, the devices shown in FIG. 2 may interconnect via wired connections and/or circuitry.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Where only one item is intended, the term "one" or similar language is used. Further, the phrase "based on" is intended to mean "based, at least in part, on" unless explicitly stated otherwise.

What is claimed is:
1. A system, comprising:
one or more devices to:
determine a first power level of a first signal output from a first modulator,
the first signal being a first optical signal associated with a first polarization orientation, and
the first modulator comprising a first plurality of tributary modulators;
determine a second power level of a second signal output from a second modulator,
the second signal being a second optical signal associated with a second polarization orientation, and
the second modulator comprising a second plurality of tributary modulators;
determine a relationship between the first power level and the second power level,
the relationship including a ratio between the first power level and the second power level;

set, based on the relationship between the first power level and the second power level, a first reverse bias voltage associated with the first modulator,
the first reverse bias voltage being used to control the first power level of the first signal;
set a second reverse bias voltage associated with the second modulator,
the second reverse bias voltage being used to control the second power level of the second signal,
the second reverse bias voltage being determined independently of the first reverse bias voltage;
control a first voltage swing associated with a first electrical signal received by a first tributary modulator of the first plurality of tributary modulators,
the first voltage swing being controlled based on a particular electrical signal filtered, by a first band pass filter, at a first dither frequency; and
control a second voltage swing associated with a second electrical signal received by a second tributary modulator of the second plurality of tributary modulators,
the second voltage swing being controlled based on the particular electrical signal filtered, by a second band pass filter, at a second dither frequency,
the second dither frequency being different than the first dither frequency,
the second band pass filter being physically separated from the first band pass filter.

2. The system of claim 1, where the one or more devices are further to:
control a first bias point associated with at least one of the first plurality of tributary modulators; and
control a second bias point associated with at least one of the second plurality of tributary modulators.

3. The system of claim 1, where each of the first plurality of tributary modulators receives a corresponding first electrical signal,
where each of the second plurality of tributary modulators receives a corresponding second electrical signal, and
where the one or more devices are further to:
control a corresponding first voltage swing associated with the corresponding first electrical signal received by each of the first plurality of tributary modulators; and
control a corresponding second voltage swing associated with the corresponding second electrical signal received by each of the second plurality of tributary modulators.

4. The system of claim 1, where the one or more devices are further to:
control a first phase relationship between a first plurality of signals output by the first plurality of tributary modulators,
the first signal, output from the first modulator, comprising the first plurality of signals; and
control a second phase relationship between a second plurality of signals output by the second plurality of tributary modulators,
the second signal, output from the second modulator, comprising the second plurality of signals.

5. The system of claim 1, where the one or more devices, when setting the first reverse bias voltage, are further to:
decrease the ratio between the first power level and the second power level.

6. The system of claim 1, where the one or more devices, when setting the first reverse bias voltage, are further to:
generate a periodic amplitude modulated signal;
generate, based on the relationship between the first power level and the second power level, an error signal;
generate, based on the error signal, a direct current bias voltage;
generate, based on the periodic amplitude modulated signal and the direct current bias voltage, a combined signal; and
set the first reverse bias voltage based on the combined signal.

7. The system of claim 1, where the first plurality of tributary modulators comprise a first IQ modulator,
where the second plurality of tributary modulators comprise a second IQ modulator,
where the first modulator is associated with the first polarization orientation,
where the second modulator is associated with the second polarization orientation, and
where the second polarization orientation is approximately orthogonal to the first polarization orientation.

8. A system, comprising:
one or more devices to:
determine a first power level of a first signal output from a first modulator,
the first signal being a first optical signal associated with a first polarization orientation;
determine a second power level of a second signal output from a second modulator,
the second signal being a second optical signal associated with a second polarization orientation;
determine a relationship between the first power level and the second power level,
the relationship including a ratio between the first power level and the second power level;
set, based on the relationship between the first power level and the second power level, a first reverse bias voltage associated with the first modulator,
the first reverse bias voltage being used to control the first power level of the first signal;
set a second reverse bias voltage associated with the second modulator,
the second reverse bias voltage being used to control the second power level of the second signal,
the second reverse bias voltage being determined independently of the first reverse bias voltage;
control a first voltage swing associated with a first electrical signal, used to modulate the first signal, received by the first modulator,
the first voltage swing being controlled based on a particular electrical signal filtered, by a first band pass filter, at a first dither frequency; and
control a second voltage swing associated with a second electrical signal, used to modulate the second signal, received by the second modulator,
the second voltage swing being controlled based on the particular electrical signal filtered, by a second band pass filter, at a second dither frequency,
the second dither frequency being different than the first dither frequency,
the second band pass filter being physically separated from the first band pass filter.

9. The system of claim 8, where the one or more devices are further to:
control a first bias point associated with the first modulator; and
control a second bias point associated with the second modulator.

10. The system of claim 8, where the particular electrical signal is amplified prior to being filtered by the first band pass filter and filtered by the second band pass filter, and where:
   the particular electrical signal is received by the first band pass filter from an amplifier, and
   the particular electrical signal is received by the second band pass filter from the amplifier.

11. The system of claim 8, where the one or more devices, when setting the first reverse bias voltage, are further to:
   decrease the ratio between the first power level and the second power level.

12. The system of claim 8, where the one or more devices, when setting the first reverse bias voltage, are further to:
   generate a periodic amplitude modulated signal;
   generate, based on the relationship between the first power level and the second power level, an error signal;
   generate, based on the error signal, a direct current bias voltage;
   generate, based on the periodic amplitude modulated signal and the direct current bias voltage, a combined signal; and
   set the first reverse bias voltage based on the combined signal.

13. A method comprising:
   determining, by one or more devices, a first power level of a first signal output from a first modulator,
      the first signal being a first optical signal associated with a first polarization orientation, and
      the first modulator comprising a first plurality of tributary modulators;
   determining, by the one or more devices, a second power level of a second signal output from a second modulator,
      the second signal being a second optical signal associated with a second polarization orientation, and
      the second modulator comprising a second plurality of tributary modulators;
   determining, by the one or more devices, a relationship between the first power level and the second power level,
      the relationship including a ratio between the first power level and the second power level;
   setting, by the one or more devices and based on the relationship between the first power level and the second power level, a first reverse bias voltage associated with the first modulator,
      the first reverse bias voltage being used to control the first power level of the first signal;
   setting, by the one or more devices, a second reverse bias voltage associated with the second modulator,
      the second reverse bias voltage being used to control the second power level of the second signal,
      the second reverse bias voltage being determined independently of the first reverse bias voltage;
   controlling, by the one or more devices, a first voltage swing associated with a first electrical signal received by a first tributary modulator of the first plurality of tributary modulators,
      the first voltage swing being controlled based on a particular electrical signal filtered, by a first band pass filter, at a first dither frequency; and
   controlling, by the one or more devices, a second voltage swing associated with a second electrical signal received by a second tributary modulator of the second plurality of tributary modulators,
      the second voltage swing being controlled based on the particular electrical signal filtered, by a second band pass filter, at a second dither frequency,
      the second dither frequency being different than the first dither frequency,
      the second band pass filter being physically separated from the first band pass filter.

14. The method of claim 13, further comprising:
   controlling a first bias point associated with at least one of the first plurality of tributary modulators; and
   controlling a second bias point associated with at least one of the second plurality of tributary modulators.

15. The method of claim 13, where each of the first plurality of tributary modulators receives a corresponding first electrical signal,
   where each of the second plurality of tributary modulators receives a corresponding second electrical signal, and
   where the method further comprises:
      controlling a corresponding first voltage swing associated with the corresponding first electrical signal received by each of the first plurality of tributary modulators; and
      controlling a corresponding second voltage swing associated with the corresponding second electrical signal received by each of the second plurality of tributary modulators.

16. The method of claim 13, further comprising:
   controlling a first phase relationship between a first plurality of signals output by the first plurality of tributary modulators,
      the first signal, output from the first modulator, comprising the first plurality of signals; and
   controlling a second phase relationship between a second plurality of signals output by the second plurality of tributary modulators,
      the second signal, output from the second modulator, comprising the second plurality of signals.

17. The method of claim 13, where setting the first reverse bias voltage includes:
   decreasing the ratio between the first power level and the second power level.

18. The method of claim 13, where setting the first reverse bias voltage includes:
   generating a periodic amplitude modulated signal;
   generating, based on the relationship between the first power level and the second power level, an error signal;
   generating, based on the error signal, a direct current bias voltage;
   generating, based on the periodic amplitude modulated signal and the direct current bias voltage, a combined signal; and
   setting the first reverse bias voltage based on the combined signal.

19. The method of claim 13, where the first plurality of tributary modulators comprise a first IQ modulator,
   where the second plurality of tributary modulators comprise a second IQ modulator,
   where the first modulator is associated with the first polarization orientation,
   where the second modulator is associated with the second polarization orientation, and where the second polarization orientation is approximately orthogonal to the first polarization orientation.

20. The method of claim 13, where setting the first reverse bias voltage includes:
   combining a dither signal with the first reverse bias voltage.

* * * * *